(12) United States Patent
Wasetzki et al.

(10) Patent No.: US 12,188,575 B2
(45) Date of Patent: Jan. 7, 2025

(54) LOCKABLE LATCH

(71) Applicant: Georg Fischer Rohrleitungssysteme AG, Schaffhausen (CH)

(72) Inventors: Maxim Wasetzki, Singen (DE); Flavio Cantoni, Neuhausen (CH)

(73) Assignee: Georg Fischer Rohrleitungssysteme AG, Schaffhausen (CH)

( * ) Notice: Subject to any disclaimer, the term of this patent is extended or adjusted under 35 U.S.C. 154(b) by 0 days.

(21) Appl. No.: 18/325,444

(22) Filed: May 30, 2023

(65) Prior Publication Data

US 2023/0383861 A1 Nov. 30, 2023

(30) Foreign Application Priority Data

May 31, 2022 (EP) .................................. 22 176 399

(51) Int. Cl.
*F16K 35/02* (2006.01)
*F16K 31/60* (2006.01)
*F16K 35/00* (2006.01)

(52) U.S. Cl.
CPC ............ *F16K 35/025* (2013.01); *F16K 31/60* (2013.01); *F16K 35/00* (2013.01)

(58) Field of Classification Search
CPC ........ F16K 35/00; F16K 35/02; F16K 35/025; F16K 35/10; F16K 35/022; F16K 31/60; F16K 31/602
USPC ....................................................... 251/101
See application file for complete search history.

(56) References Cited

U.S. PATENT DOCUMENTS

| | | | |
|---|---|---|---|
| 2,234,052 A * | 3/1941 | Luenz ..................... | F16K 35/00 |
| | | | 251/95 |
| 2,539,106 A * | 1/1951 | Schenck ............... | F16K 27/062 |
| | | | 251/312 |
| 3,298,661 A * | 1/1967 | Stam ..................... | F16K 35/025 |
| | | | 188/69 |
| 4,568,059 A * | 2/1986 | Kawase ................ | F16K 5/0626 |
| | | | 251/99 |
| 5,188,335 A | 2/1993 | Pettinaroli | |
| 5,588,316 A * | 12/1996 | Jones ..................... | F16K 35/10 |
| | | | 70/199 |
| 6,260,819 B1 * | 7/2001 | Ovsepyan .............. | F16K 35/06 |
| | | | 251/95 |
| 9,534,703 B2 * | 1/2017 | Holmes .................. | F16K 35/14 |
| 9,976,671 B2 * | 5/2018 | Luciotti ................. | G05G 1/082 |

(Continued)

*Primary Examiner* — Kenneth Rinehart
*Assistant Examiner* — Jonathan J Waddy
(74) *Attorney, Agent, or Firm* — Harness, Dickey & Pierce, P.L.C.

(57) ABSTRACT

A device for locking a turning handle of a valve containing a handle for actuating a shut-off element of a valve, a latching ring that can be arranged in a rotationally conjoint manner on a valve housing support for an actuating device and an adapter that can be arranged on a drive journal of a shut-off element such that it can be fixed and released again, wherein the adapter and the handle are connected to one another in a releasable manner, wherein an axially displaceable and non-rotatable sliding ring is arranged on the handle, wherein the sliding ring can be displaced axially into a locking or open position and in the locking position the sliding ring locks the rotational movement of the handle and the handle cannot be removed from the valve on account of the position of the sliding ring in the locking position.

8 Claims, 3 Drawing Sheets

(56) References Cited

U.S. PATENT DOCUMENTS

| | | | | |
|---|---|---|---|---|
| 10,352,461 | B2* | 7/2019 | Akamoto | F16K 25/005 |
| 2008/0006792 | A1* | 1/2008 | Hasunuma | F16K 1/482 251/205 |
| 2009/0261280 | A1 | 10/2009 | Matsushita et al. | |
| 2014/0026981 | A1* | 1/2014 | Bisio | F16K 5/0647 137/315.18 |
| 2016/0091111 | A1* | 3/2016 | Akamoto | F16K 35/06 137/385 |
| 2016/0327179 | A1* | 11/2016 | Luciotti | F16K 7/126 |
| 2019/0242492 | A1* | 8/2019 | Harbour | F16K 31/60 |
| 2021/0262585 | A1* | 8/2021 | Ueno | F16K 35/027 |

* cited by examiner

LOCKABLE LATCH

CROSS-REFERENCE TO RELATED APPLICATION

The present application claims priority to European Patent Application No. 22 176 399.8, filed on May 31, 2022, the entire contents of which are incorporated herein by reference.

TECHNICAL FIELD

The invention relates to a device for locking a turning handle of a valve, preferably of a rotary valve, especially preferably of a ball valve or a shut-off valve, containing a handle for actuating a shut-off element of a valve, a latching ring that can be arranged in a rotationally conjoint manner on a valve housing support for an actuating device and an adapter that can be arranged on a drive journal of a shut-off element such that it can be fixed and released again, wherein the adapter and the handle are connected to one another in a releasable manner.

BACKGROUND

Rotary valves, primarily shut-off valves, usually have a two-part lever which is tilted from locking toothing during actuation and thereby enables the valve to be turned in the housing. If the lever is then no longer actuated, the toothing on the lever once again meshes with toothing on the housing or a rigid plate, in order to lock the shut-off valve in this position. Levers of this kind are usually suitable for large shut-off valves and cannot be used for small, compact valves. In addition, levers of this kind are usually fixedly connected to the rotational axis of the valve.

US 2009/0261280 A1 discloses a rotary valve having a handle and a locking element that can be mounted in addition. The locking element can be attached with the ball valve in any position and it prevents the degree of aperture of the valve from being changed. The disadvantage of this is the additional expenditure that has to be made in order to attach this locking element and that it is also designed as a separate part and is therefore easy to lose. In addition, the lever itself may also be lost because there is no locking mechanism.

An aspect of the invention is to propose a device with which the position of a valve can be locked and in which the handle cannot be removed from the valve in the locked position.

This aspect is achieved according to the invention, in that a non-rotatable sliding ring is arranged on the handle in an axially displaceable manner, wherein the sliding ring can be displaced axially into a locking or open position and in the locking position the sliding ring locks the rotational movement of the handle and the handle cannot be removed from the valve on account of the position of the sliding ring in the locking position.

SUMMARY

The device according to the preferred embodiment of the invention for locking a turning handle of a valve preferably relates to a rotary valve. This includes valves which have a rotatable shut-off element that is actuated via a rotational axis and can usually be turned through 90 to 180 degrees, wherein the rotational axis is usually arranged at right angles or on a slight slant to the flow direction. Ball valves or shut-off valves are preferred valves, in which a device according to the invention is used for locking a turning handle. The device according to the invention for locking a turning handle contains a handle for actuating a shut-off element of a valve, wherein the handle preferably comprises a neck and a gripping body. In addition, the device according to the invention contains a latching ring, wherein the latching ring can be arranged in a rotationally conjoint manner on a valve housing support for an actuating device. The latching ring is preferably arranged in a form-fitting manner on the housing support. In addition, it is advantageous for the latching ring to be coded, as a result of which it can only be fastened in one position on the housing. The device according to the invention also contains an adapter, wherein the adapter is used to lengthen the journal and the adapter is designed in such a manner that it can be arranged on the drive journal of the shut-off element. The adapter is arranged on the drive journal such that it can be fixed and also released again. The drive journal of a shut-off element can of course also be formed by the end of a continuous rotational axis. The handle with the adapter is likewise connected in a releasable manner. The adapter and the handle are preferably connected to one another in a releasable manner. In order to perform the functions of the lock and the non-removable handle in the locked position, the device according to the invention has a sliding ring, wherein the sliding ring is arranged on the handle, preferably on the neck of the handle. The sliding ring can be displaced into a locking position and an open position axially along the handle parallel to the rotational axis of the valve. In the locking position, the sliding ring locks the handle so that it can no longer be turned and the position of the shut-off element is thereby locked. In addition, when the sliding ring is in this position, the handle cannot be removed from the valve or cannot be released along the rotational axis in an axial direction.

When the sliding ring is in the locking position, a toothing on the sliding ring preferably meshes with a toothing on the latching ring, wherein the toothings guarantee that the turning movement of the handle is locked. The movement of the sliding ring into the open position means that the toothings of the sliding ring and of the latching ring no longer mesh with one another and the handle can be turned once again.

A preferred embodiment has emerged in which the toothing is arranged on the sliding ring in a region of the sliding ring facing the latching ring, and the sliding ring meshes with the toothing on the latching ring in the locking position. The fact that the toothing is arranged at least in the lower region of the sliding ring and the toothing on the latching ring has a small width also means that only a small stroke is needed in order to release the sliding ring from its engagement with the toothing on the latching ring.

In accordance with a preferred embodiment, the adapter has a fixing element by means of which the adapter is fixed to the drive journal in a releasable manner. The adapter is arranged on the drive journal of the valve in a detachable manner and fixed axially and also radially, wherein there is preferably a form fit between the adapter and drive journal for radial fixing. The fixing element, which has an elastic design, is used for axial fixing. The fixing element is arranged on the adapter and engages with a recess in the drive journal when it is slipped onto the drive journal, as a result of which the adapter is fixed in a releasable manner.

It is advantageous for the handle to have a fixing element by means of which the handle is fixed to the adapter in a releasable manner. The fixing element on the handle has an elastic design and engages with a recess or depression when the handle is slipped onto the adapter and thereby fixes the handle in the axial direction. The journal of the adapter and the receiving means of the handle, into which the journal is inserted, preferably have a form fit, as a result of which they are fixed radially to one another.

The fixing elements are preferably locked when the sliding ring is in the locking position, in such a manner that the handle cannot be removed from the valve. The position of the sliding ring in the locking position means that the fixing elements are locked and can no longer be elastically deformed, as they are locked by the sliding ring. It is advantageous for a supporting lug to be arranged on the sliding ring for this purpose, wherein the supporting lug is arranged in an outwardly displaced manner concentrically to the fixing elements and locks said fixing elements in terms of their flexibility.

It has proved advantageous for the fixing elements to be designed as snap-action connections. This allows them to snap into place elastically in a recess or depression and enables the connection to be released again. If this sliding ring is now in the locking position, the possibility of a snap-action or the elastic swivelling-out of the fixing element is suppressed. The fixing elements are preferably locked by the supporting lugs on the sliding ring.

The toothing is preferably arranged on the inner diameter of the sliding ring and on the outer diameter of the latching ring. It has also proved advantageous for the toothing on the latching ring to run at least over a quarter of the circumference of the latching ring and for the toothing on the sliding ring to be formed by at least one tooth, wherein a reverse design can also likewise be envisaged. An embodiment in which multiple teeth are preferably arranged at regular intervals on the inner diameter of the sliding ring has also proved further advantageous.

It is advantageous for a scale for determining the degree of aperture of the valve to be arranged on the latching ring.

The sliding ring is preferably displaced axially downwardly in the locking position and axially upwardly in the open position. In other words, the sliding ring is arranged on the neck of the handle at the bottom in the locking position and at the top in the open position.

It is advantageous for the sliding ring to have a closable design in the locking position. It can thereby be guaranteed that the sliding ring is not actuated by unauthorized individuals. It is advantageous for the sliding ring to have an eye or a kind of hook for this purpose, so that a safety lock can be fastened thereto, which makes a displacement of the sliding ring into the open position impossible.

The handle, adapter, latching ring and sliding ring elements of the device according to the invention are preferably all connected to one another in a releasable manner simply by plugging them together and fastened to the valve in a releasable manner. No further fastening elements are required.

All possible embodiments can be freely combined with one another.

BRIEF DESCRIPTION OF THE DRAWINGS

An exemplary embodiment of the invention is described with the help of the figures, wherein the invention is not only limited to the exemplary embodiment. In the drawing.

DESCRIPTION OF THE PREFERRED EMBODIMENTS

Figure 1:
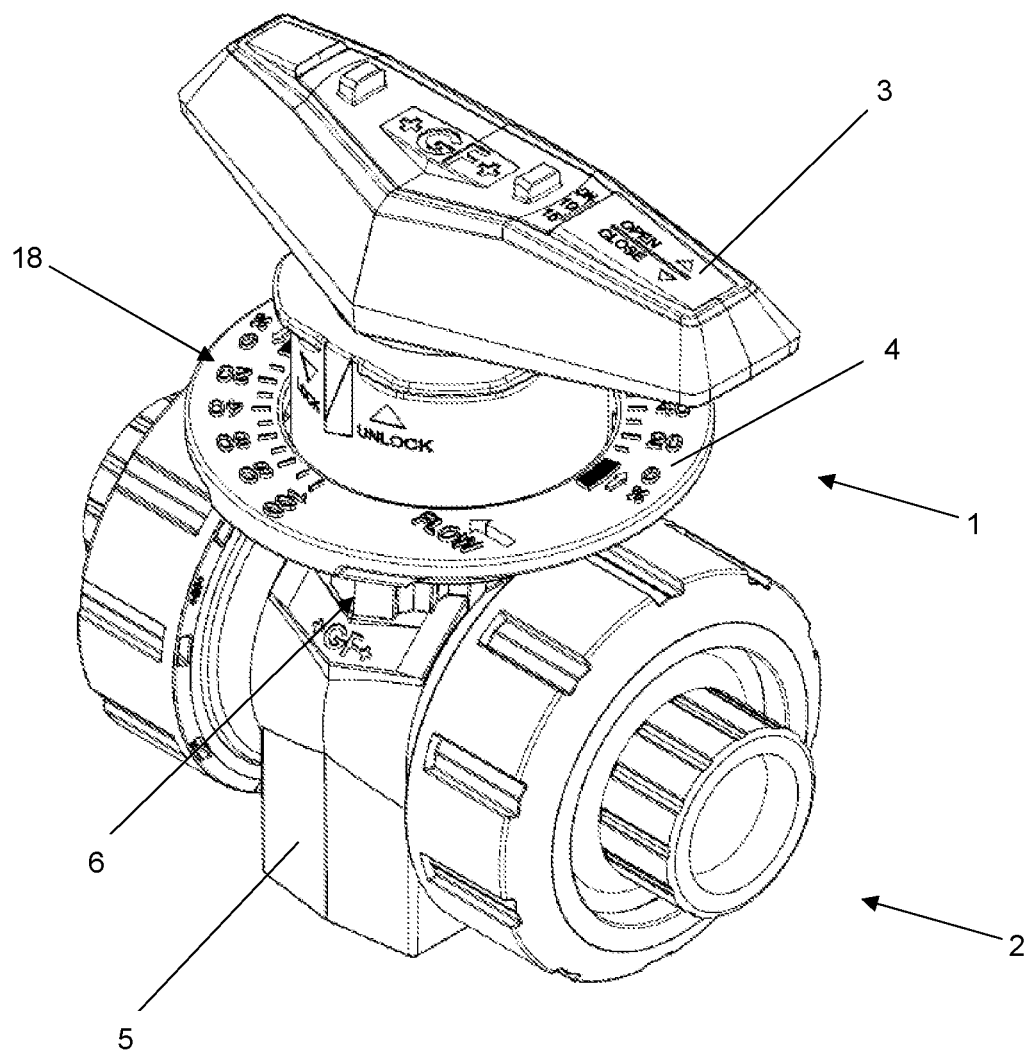
FIG. 1 shows a three-dimensional view of a valve with the device according to the invention.

The drawing represented in FIG. 1 shows a three-dimensional depiction of a ball valve with a device 1 according to the invention for locking a turning handle of a valve 2 or the shutoff element thereof. The device 1 according to the invention contains a handle 3 for actuating the shut-off element. In addition, the device 1 according to the invention has a latching ring 4 which is arranged on the valve housing 5 in a form-fitting manner. The latching ring 4 is arranged on the valve housing support 6, which is used to receive an actuating device. The latching ring 4 is fastened simply by fitting on and no separate fastening means are required. The latching ring 4 has an indexing, as a result of which it can be mounted in only one position. Furthermore, the device 1 according to the invention has an adapter 7 which can be clearly seen in FIGS. 3 and 4. The adapter 7 is arranged on the drive journal 8 of the valve 2. A form fit is used for the radial fixing between the adapter 7 and the drive journal 8, in other words the drive journal 8 is received in a counterbore 9 in the adapter 7 in a form-fitting manner. A fixing element 10 is used for the axial fixing, which is releasable. This is preferably designed as a snap-action connection. FIG. 4 shows clearly how the fixing element 10 projects into the recess 11 in the drive journal 8. This can be clearly seen in FIGS. 3 and 4 too. The handle 3 is likewise connected to a fixing element 12 with the adapter 7 in a releasable manner. Here too, a snap-action connection is preferably used for this. The sliding ring 13 belonging to the device 1 according to the invention can be clearly seen in FIG. 3, said sliding ring being shown in the locking position and being arranged on the handle 3 and being displaceable in the axial direction. The sliding ring 13 is arranged on the neck 14 of the handle 3 and can be displaced from below in the locking position into the upper open position, which can be seen in FIG. 4. The device 1 according to the invention 1 with the contained elements of the handle 3, adapter 7, latching ring 4 and sliding ring 13 are all connected to one another simply by plugging them together and fastened to the valve 2. No further fastening elements are required. In the locking position, the toothing 16 of the sliding ring 13 engages with the toothing 15 of the latching ring 4, as a result of which the rotational movement of the handle 3 is locked, or the position of the valve 2 and the shut-off element thereof is locked. In addition, the sliding ring 13 locks the fixing elements 10, 12, as can clearly be seen from FIG. 3. The fixing elements 10, 12 can no longer be elastically deformed and temporarily displaced due to the supporting lug 17 which blocks their freedom of movement, as a result of which the handle 3 and also the adapter 7 cannot be removed from the valve 2. The snap-action connections are thereby locked by the sliding ring 13.

Figure 2:
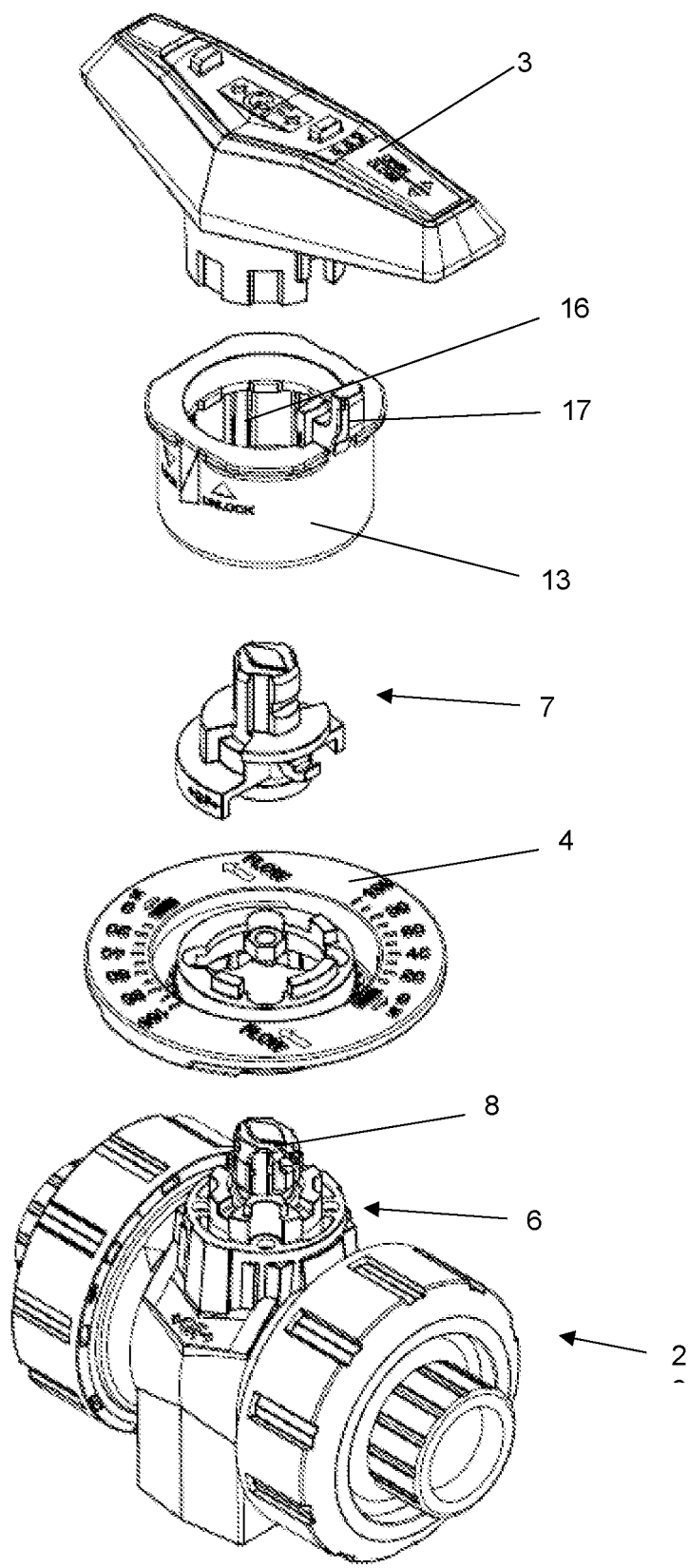
FIG. 2 shows an exploded drawing of the device according to the invention.
Figure 3:
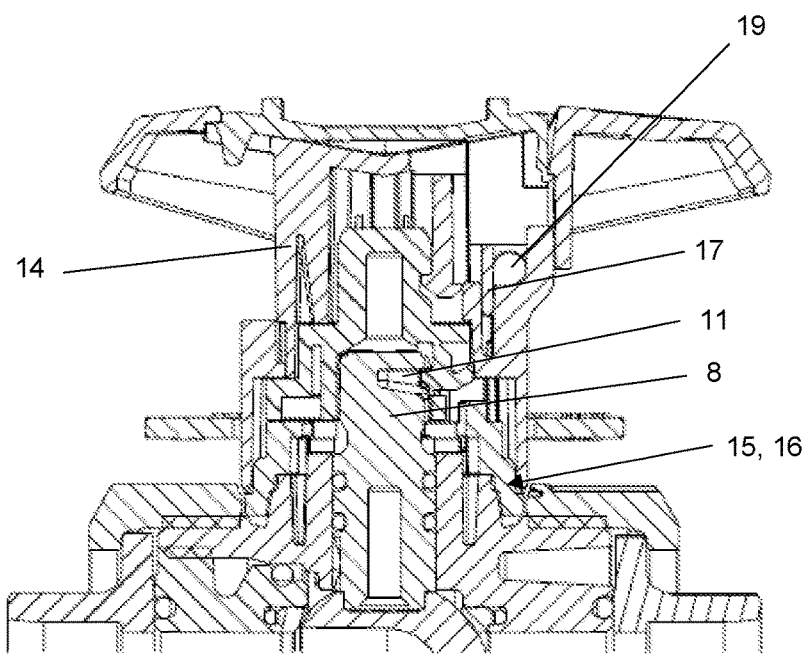
FIG. 3 shows a sectional view of the device according to the invention in the locking position.
Figure 4:
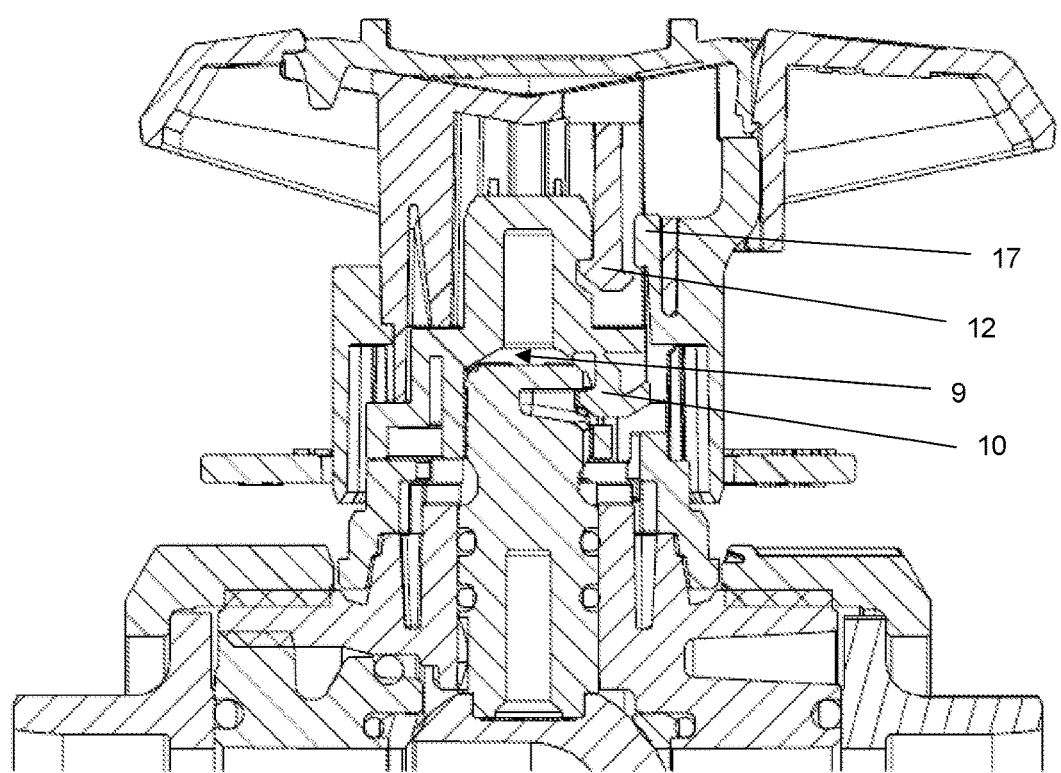
FIG. 4 shows a sectional view of the device according to the invention in the open position.

FIG. 3 shows the toothing 15 on the latching ring 4 which surrounds at least a quarter of the circumference of the latching ring 4, but preferably the entire circumference. The toothing 16 on the inner diameter of the sliding ring 13 can be seen in FIG. 2, said toothing containing at least one tooth, but preferably being formed from multiple regularly spaced teeth.

The latching ring 4 preferably has a scale 18 which indicates the degree of aperture of the valve 2.

It can clearly be seen in FIG. 3 that it is advantageous for the sliding ring to have a lug or eye 19 or for the lug on the sliding ring 13 to form an eye with the handle 3, in order to attach a safety lock thereto. It is thereby guaranteed that no unauthorized individual is able to move the sliding ring 13 when it is in the locking position into the open position and adjust the valve 2 or remove the handle 3 from the valve 2.

What is claimed is:

1. Apparatus for locking a turning handle of a valve having a shut-off element, said apparatus comprising:
   the valve having a housing; a drive journal of the shut-off element, the drive journal
   having a recess;
   a latching ring rotationally fixed on the housing;
   an adapter;
   a first snap-action fixing element selectively engaging the recess in the drive journal for releasably connecting the adapter to the drive journal;
   a second snap-action fixing element releasably connecting the adapter to the handle; and
   a sliding ring arranged on the handle, the sliding ring being configured to be axially displaceable and selectively engaging the first snap-action fixing element and second snap-action fixing element to thereby lock the handle to the adapter—because the handle doesn't open, and to clarify what about the handle is being locked.

2. A device for locking a turning handle of a valve, comprising the handle for actuating a shut-off element of the valve, a latching ring arranged in a rotationally conjoint manner on a valve housing support and an adapter arranged on a drive journal of the shut-off element such that it can be fixed and released again by means of a fixing element, wherein the adapter and the handle are connected to one another in a releasable manner by fixing elements, wherein an axially displaceable and non-rotatable sliding ring is arranged on the handle, wherein the sliding ring can be displaced axially into a locking position or an open position wherein, in the locking position, the sliding ring locks the rotational movement of the handle and the handle cannot be removed from the valve on account of the position of the sliding ring in the locking position, wherein the fixing elements are configured to provide snap-action connections.

3. The device according to claim 2, wherein, when the sliding ring is in the locking position, a toothing on the sliding ring meshes with a toothing on the latching ring, wherein the toothings guarantee that the rotational movement of the handle is locked.

4. The device according to claim 2, wherein toothing is arranged on the sliding ring in a region of the sliding ring facing the latching ring, and the sliding ring toothing meshes with toothing on the latching ring in the locking position and locks the handle.

5. The device according to claim 2, wherein the fixing elements are locked when the sliding ring is in the locking position, in such a manner that the handle cannot be removed from the valve.

6. The device according to claim 2, wherein toothing is arranged on the inner diameter of the sliding ring and toothing is arranged on the outer diameter of the latching ring.

7. The device according to claim 2, wherein a scale for determining a degree of opening of the valve is arranged on the latching ring.

8. The device according to claim 2, wherein the sliding ring is displaced axially downwardly in the locking position and axially upwardly in the open position.

* * * * *